May 29, 1956  W. TABET  2,747,450
LATHE
Filed March 23, 1953  5 Sheets-Sheet 1

INVENTOR:
WILLY TABET
BY:

May 29, 1956 W. TABET 2,747,450
LATHE
Filed March 23, 1953 5 Sheets-Sheet 2
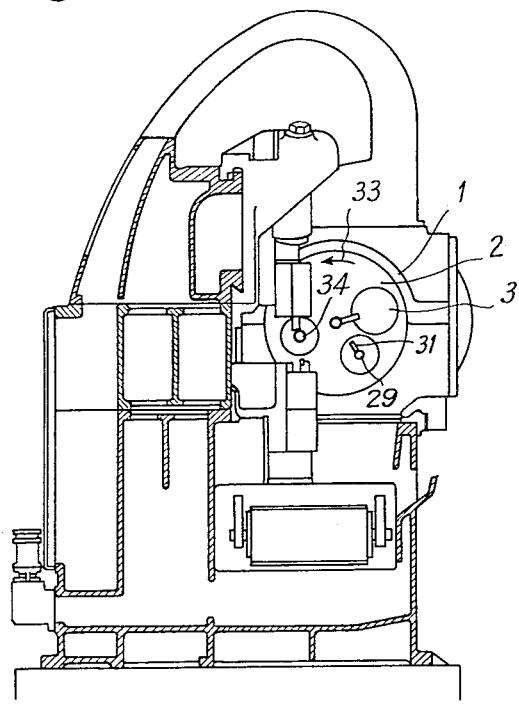
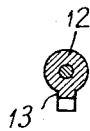
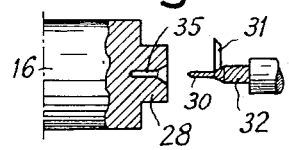
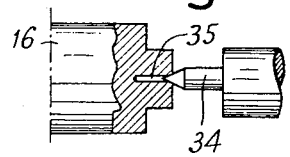
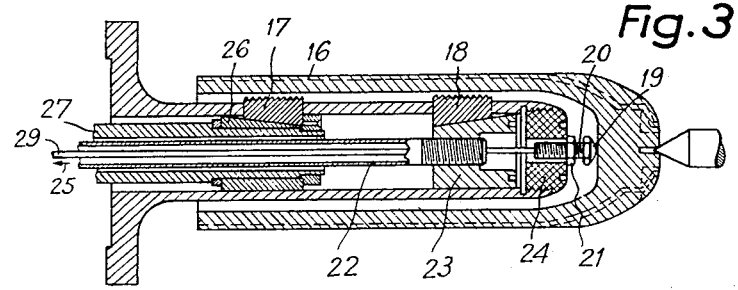
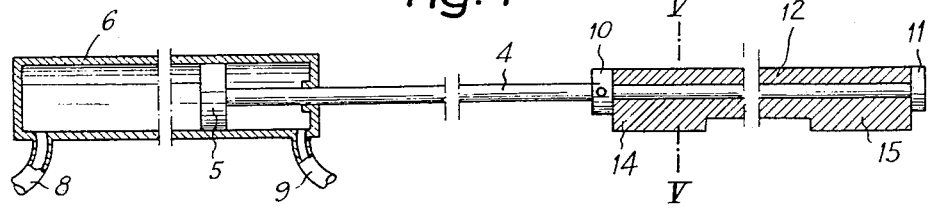
INVENTOR
WILLY TABET
BY:

May 29, 1956    W. TABET    2,747,450
LATHE
Filed March 23, 1953    5 Sheets-Sheet 3

INVENTOR:
WILLY TABET
BY:

May 29, 1956 W. TABET 2,747,450
LATHE
Filed March 23, 1953 5 Sheets-Sheet 5

INVENTOR:
WILLY TABET
BY:

United States Patent Office 2,747,450
Patented May 29, 1956

2,747,450

LATHE

Willy Tabet, Forest-Brussels, Belgium, assignor to S. A. Le Progres Industriel, Lot Brussells, Belgium Application March 23, 1953, Serial No. 344,039

Claims priority, application France January 8, 1953

3 Claims. (Cl. 82—2.5)

This invention relates to devices for feeding workpieces to be machined to, and discharging machined workpieces from lathes and has for its primary object a device which provides improved lathe performance as a result of the automatic circulation of the workpieces.

According to the invention, a workpiece feeding and discharging device comprises a rotary turret having its axis of rotation parallel to the axis of the lathe spindle and being traversed by a passage adapted to be brought into alignment with the spindle, and an evacuator distributor constituted by a conveyor and a pusher rod passing through the turrent, said pusher rod controlling the displacement of the workpieces between the conveyor and the turret passage in order to feed or to unload the lathe.

The invention will now be described in greater detail and with reference to one particular embodiment given by way of example and illustrated in the accompanying drawings. In said drawings:

Figure 2 is a transverse section along the line II—II of Figure 1;

Figure 3 is a longitudinal section of the means for securing in the lathe the workpieces which have been introduced by the device of the invention;

Figure 4 shows in section the pusher assembly introducing the workpieces into the lathe and its driving jack;

Figure 5 is a section on the line V—V in Figure 4;

Figure 7 illustrates the operation of drilling and aligning the centre in a workpiece to be machined;

Figure 8 shows the piece to be machined held by a center mounted on the turret;

Figure 1:
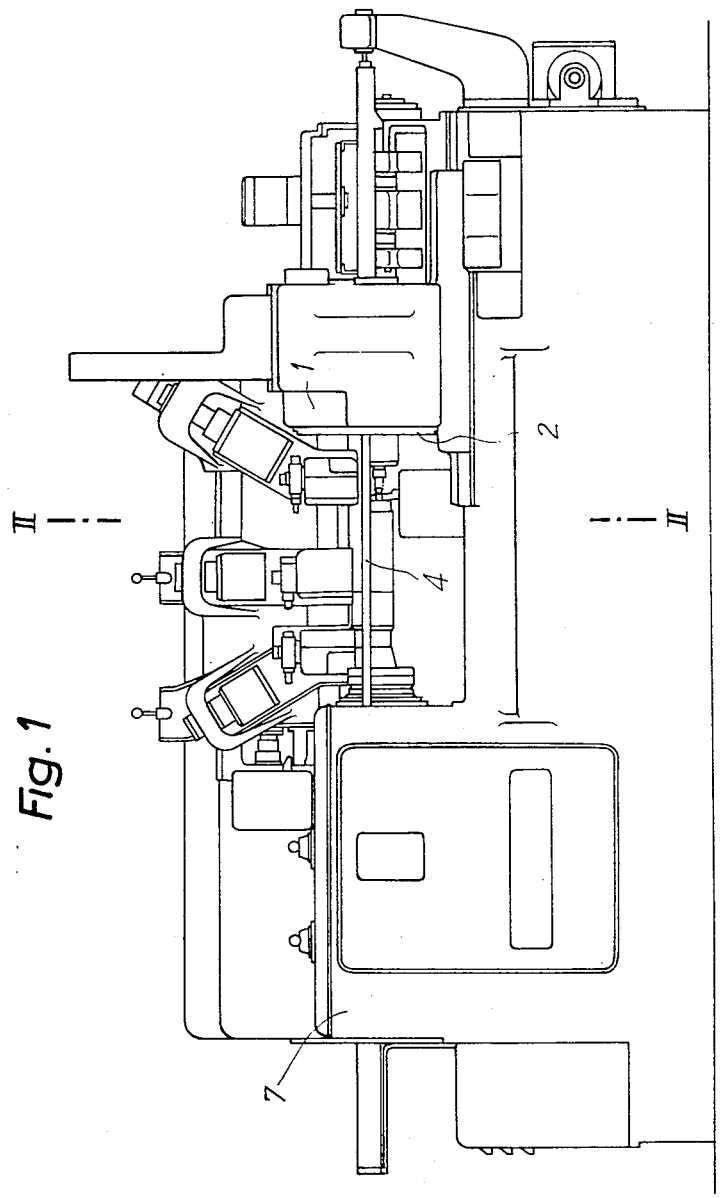
Figure 1 is a front elevation of a lathe fitted with the device of the invention.
Figure 6:
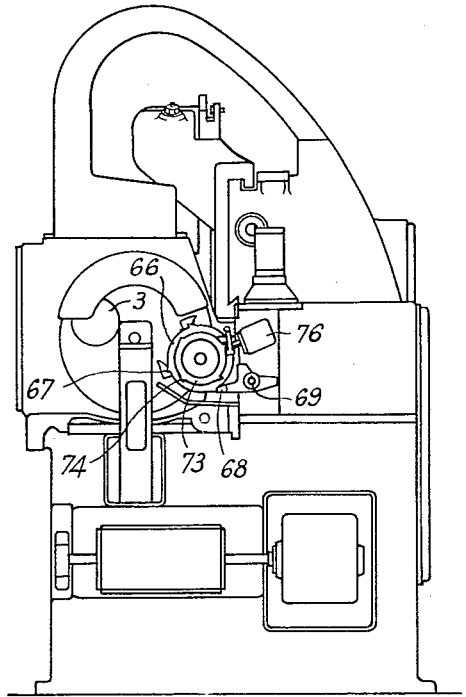
Figure 6 is an end view of the lathe illustrated in Figure 1.

The lathe illustrated in Figures 1, 2, and 6 comprises a frame 1 in which turns a turret 2 the axis of which is horizontal and parallel to the lathe spindle. The turret 2 is traversed throughout by a passage 3. A rod 4 which is mounted for sliding movement in the axis of the turret terminates at one of its ends in a piston 5 (Figure 4) movable in a cylinder 6 provided in the headstock frame 7 of the lathe. Conduits 8 and 9 supply the hydraulic pressure successively to the two sides of the piston 5 in order to control the displacements of said piston in one direction or the other.

The rod 4 has in addition two collars 10 and 11 rigidly fixed thereon, between which is mounted a pusher 12 freely rotatable on the rod 4. The pusher 12 has a part 13 sliding in a corresponding groove in the turret 2, and also has fingers 14 and 15 adapted to pass through channels of suitable shape in the turret and thereby advance the workpiece to be machined, or withdraw the machined workpiece, through the passage 3 in the turret.

When the passage 3 in the turret is in line with the lathe spindle, one of the workpieces 16 to be machined is engaged in the passage 3 in the turret under the action of the finger 15 of the pusher 12. The movement of the push-rod is continued until the workpiece is gripped and held firmly by the usual securing means of the lathe. These means differ depending on the shape of the workpiece. For example use may be made of a simple jaw chuck or, as illustrated in Figure 3, of means intended to receive hollow workpieces, such as, for example, shells. In the latter case the workpiece 16 is engaged by jaws 17 and 18. The position of the workpiece is determined longitudinally by a stop 19 forming the head of a screw 20 which can be secured in any desired position of adjustment by a lock nut 21. When the workpiece 16 is in position on the jaws, the latter may be firmly applied against the internal wall of the workpiece by any conventional device, such as that illustrated in Figure 3. As here shown, a hollow rod 22 carrying a part 23 fixed to a member 24 in which the screw 20 is engaged, is adapted to be pulled in the direction of the arrow 25. The part 23 has conical surface portions which act on the jaws 18 and push them out against the workpiece 16. In addition, a part 26 having conical surface portions is moved axially within the jaws 17 by a tube 27 and presses said jaws against the interior of the workpiece 16.

If desired, tightening of the jaws against the workpiece may be controlled by the head 19 in such manner that it is effected only when the workpiece 16 bears against the head. For this purpose the head 19 is fixed to a rod 29 which, for example, actuates a hydraulic valve controlling the fluid feed to jacks driving the part 23 and the tube 27. The jaws 17 and 18 do not expand to grip the workpiece 16 until the latter moves the head 19.

The workpiece 16, being now firmly held in the lathe, can undergo various machining operations therein.

The turret 2 is first rotated so as to place in alignment with a central stud 28 of the workpiece 16 to be machined, a rotary tool mounted in the turret and comprising a drill 30 and an integral tool 31 for facing the end of said stud. After withdrawal of the drill the turret 2 continues its rotational movement in the direction of the arrow 33 (Figure 2) until a tailstock 34 thereon is presented in front of the centre hole 35 which has been machined by the drill 30. The workpiece which is then held by the jaws 17 and 18 and tailstock 34, is driven rotationally and the lathe operations proper can commence. When these operations are completed, the tailstock 34 is withdrawn and the turret 2 turns in the opposite direction to the arrow 33 until the passage 3 is in line with the lathe spindle.

Throughout the rotation of the turret 2, the latter has driven the pusher 12, which thus has turned around the rod 4. When the passage 3 comes into line with the lathe spindle, the fingers 14 and 15 again take up position at opposite ends of the machined workpiece 16 and the finger 14 then drives said workpiece after the jaws 17 and 18 have been released. Means may be provided to stop the turret 2 at the moment when the passage 3 is in alignment with the lathe spindle or when the drill 30 or the tailstock 34 is presented opposite the stud 28 on the workpiece to be machined.

According to the invention, the pusher 12 has associated therewith a conveyor for advancing a workpiece to be machined towards the lathe each time that the latter is conditioned to receive it, and for discharging each workpiece finished by the lathe. This conveyor is illustrated in detail in Figures 9, 10 and 11.

The conveyor comprises a transverse feed ramp 36 along which the workpieces 16 roll gravitationally and a transverse discharge ramp 37 by which the finished workpieces are automatically discharged, the ramp 37 being arranged beneath the ramp 36. Between the ends of the two ramps 36 and 37 there are provided a rotary member 38 having cradles 39, and a lift 40. The lift 40 is displaceable vertically in front of a ramp portion 41 arranged above the ramp 36 and which supplies the workpieces 16 directly to the cradles 39 presented in front of it.

Figure 9:
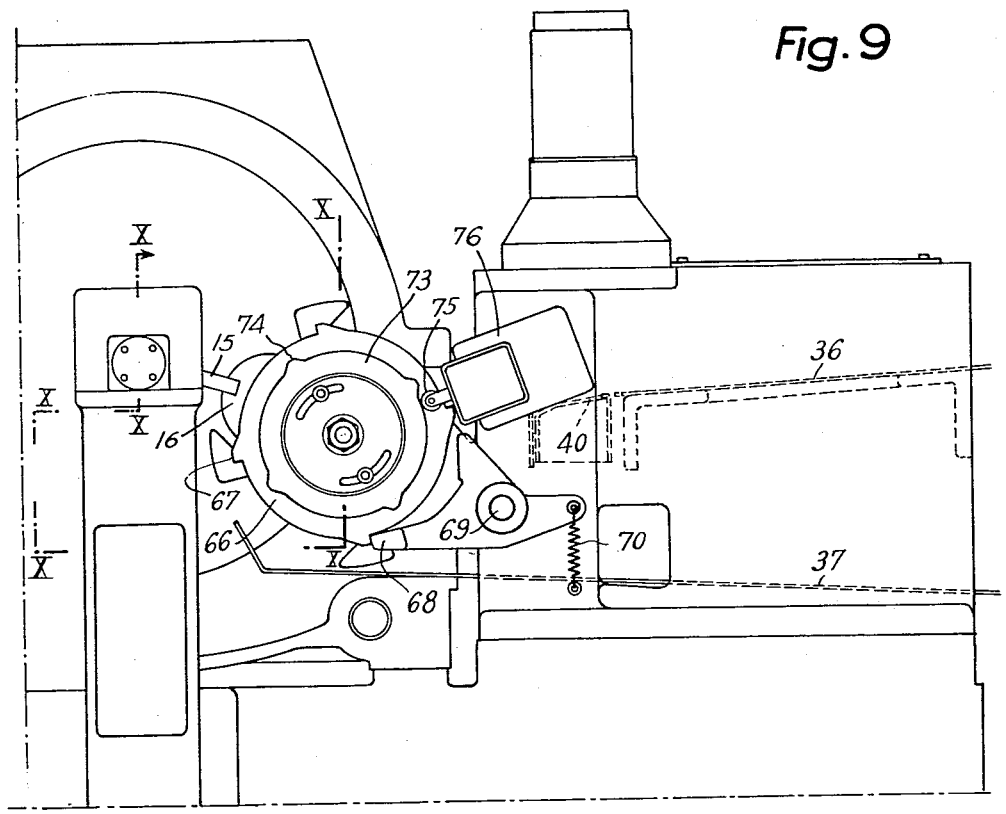
Figure 9 shows on a larger scale the combination of the conveyor with the lathe.
Figure 11:
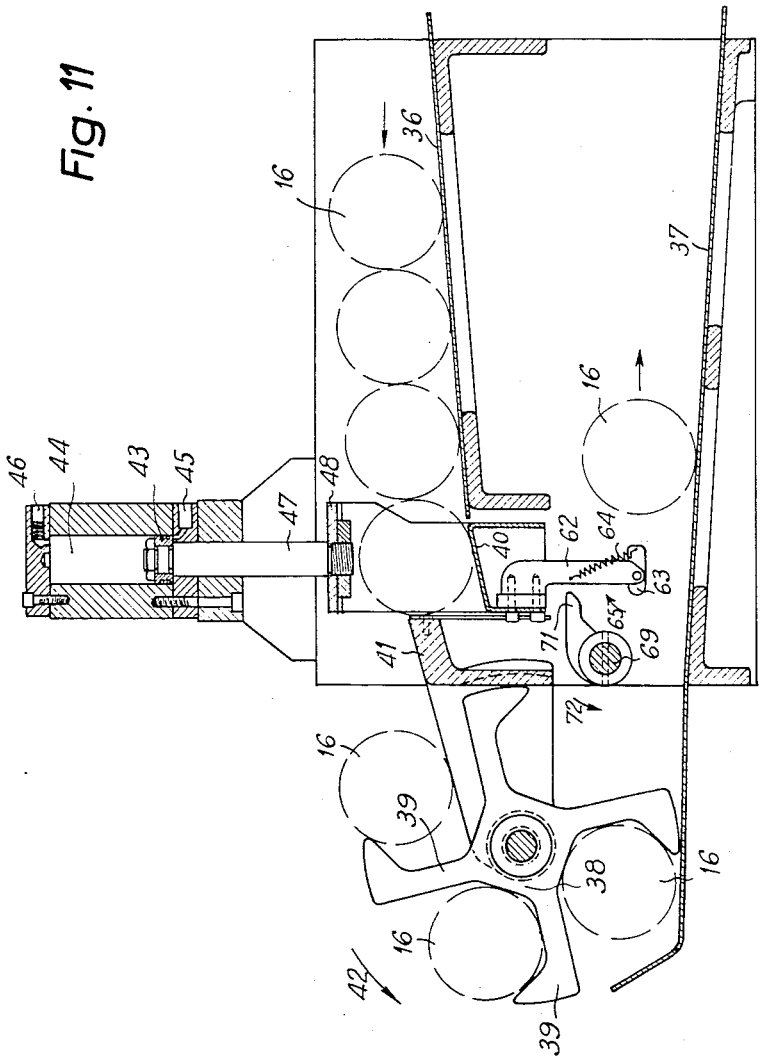
Figure 11 is a section along the line XI—XI of Figure 10.

While the lathe is operating on a workpiece 16, the lift 40 occupies the lower position illustrated in Figures 9 and 11, being aligned with the ramp 36. When the lathe is free, that is to say, when the pusher 12 has discharged a machined workpiece from the lathe and has delivered it to that one of the cradles 39 situated opposite the passage 3 in line with the spindle, the lift 40 raises the workpiece 16 thereon until said workpiece passes on to the ramp 41 and from thence downwardly to reach the cradle 39 located in front of it.

By means now to be described, the rotary member 38 is movable in a stepwise manner in the direction of the arrow 42, to supply the workpieces to, and discharge them from, the turret. The rotary member 38 has four cradles 39, and each time one of the cradles receives from ramp 41 a workpiece 16 to be machined, said member is freed from a locking device, then given a quarter turn, and thereafter brought to rest and again locked by the locking device. This movement is carried out automatically under the action of the weight of the workpieces to be machined or already machined and carried by the cradles 39. The member 38 simultaneously distributes the finished workpieces 16 to the discharge ramp 37.

The lift 40 is operated by a hydraulic jack, the piston 43 (Figure 11) of which is vertically displaceable in a cylinder 44 having a lower port 45 and an upper port 46 for the liquid. The piston rod 47 connects the piston 43 to a plate 48 supporting the lift 40. In order to render the feed automatic, the movements of the lift 40 are controlled by the movements of the pusher rod 4.

Figure 10:
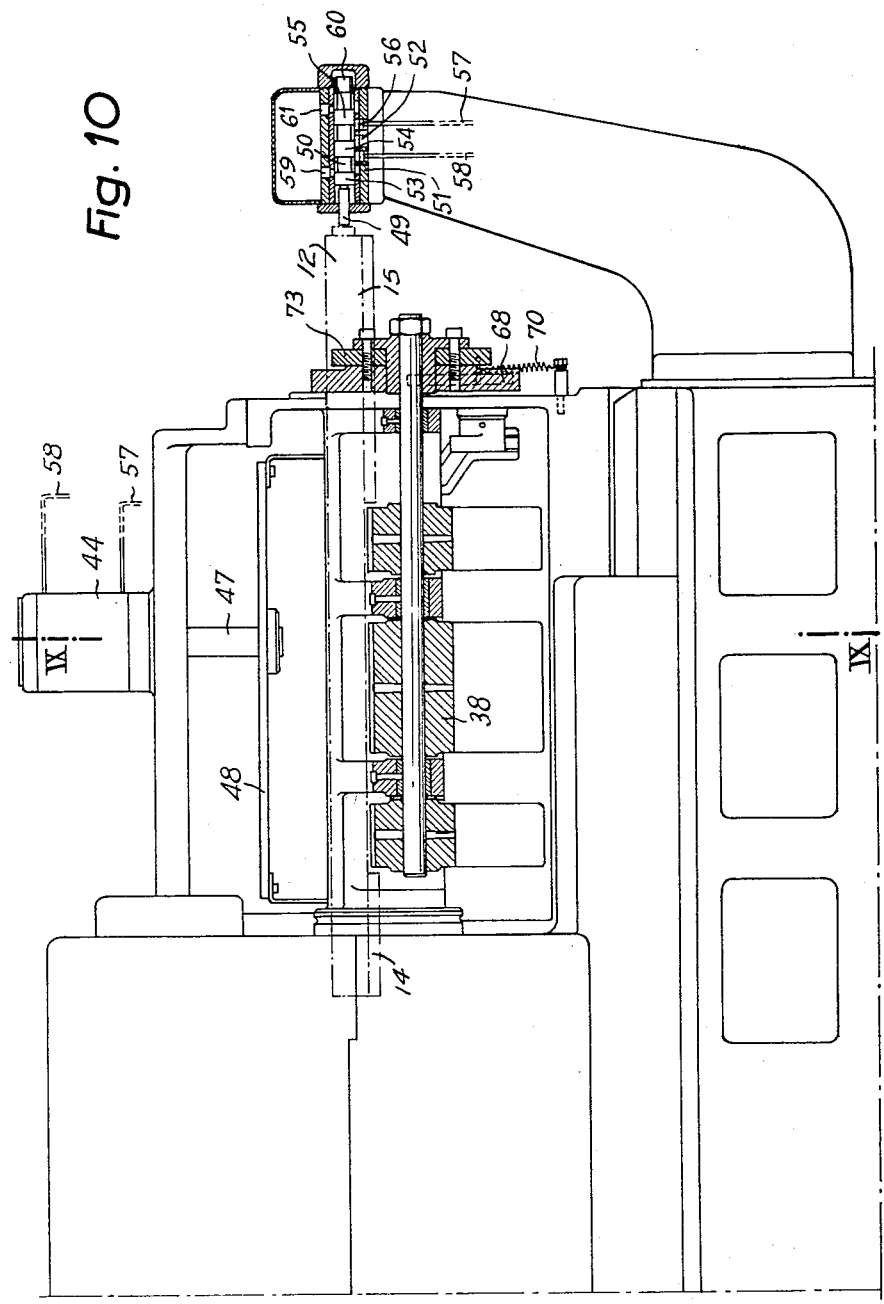
Figure 10 is a side elevation, partly in section along the lines X—X of Figure 9.

When the rod 4 has been moved to the right in Figure 10, that is to say, when the pusher 12 has withdrawn a finished workpiece from the lathe and transferred it to that cradle 39 situated opposite the passage 3 in the turret, the end of the rod 4 engages a push button 49 which controls the movable part 50 of a distributor 51. This distributor delivers the hydraulic liquid into the lower end of the cylinder 44 so as to effect the raising of the lift 40. It also has a liquid inlet 52 connected to one of the hydraulic pumps of the lathe. In the case illustrated in Figure 10, the bearing surfaces 53, 54 and 55 of the movable part 50 of the distributor are disposed in such manner that the liquid entering at 52 is discharged at 56 through a pipe 57 to the lower end of the cylinder 44, while the liquid evacuated from the top part of said cylinder through a pipe 58, is discharged through an aperture 59 in the distribtuor and returned to the liquid tank.

When the rod 4 of the pusher is displaced towards the left in Figure 10, the movable part 50 of the distributor is returned by a spring 60. It is then the pipe 58 which receives the liquid under pressure from the pump, while the pipe 57 serves to evacuate the liquid from the lower end of the cylinder 44, said liquid being returned through an aperture 61 to the tank. Thus when the pusher rod arrives at the end of its stroke towards the right in Figure 10, the lift 40 rises, while when the rod is moved to the left, the lift descends.

The lift 40 carries at its lower part a support 62 on which is pivoted an arm 63 constantly urged into a horizontal position by a spring 64, but able to pivot against the action of the spring in the direction of arrow 65. In addition, the rotary member 38 has rigid therewith a ratchet disc 66 having projections 67 which successively strike against the nose of a pawl 68 fixed on a spindle 69. The pawl 68 is constantly subjected to the action of a spring 70 which tends to press its nose against the ratchet disc 66. The spindle 69 also carries a finger 71 projecting into the path of the arm 63. When the lift 40 rises, that is to say, when a machined workpiece is discharged from the lathe and is placed on one of the cradles 39 and a new workpiece to be machined arrives on another cradle from the lift 40, the arm 63 rocks the finger 71 in the direction of the arrow 72 and consequently the pawl 68 is moved away from the ratchet disc 66, to disengage its nose from the notch 67 against which it was bearing. The rotary member 38 then turns under the action of the weight of the workpieces carried by the cradles 39 until the next projection 67 comes into contact with the nose of the pawl 68. The projections 67 are disposed on the ratchet disc 66 in such manner that the cradles 39 successively present the workpieces to be machined opposite the opening 3 in the turret 2.

The rotary member 38 also carries a second disc 73 provided with teeth 74 which engage a roller 75 controlling an electric valve 76 which effects the displacement of the rod 4 to the left in Figure 10 by supplying liquid through the pipe 9 to the cylinder 6. After the rotary member 38 has stopped, the rod 4 therefore starts back in the opposite direction in order to insert a fresh workpiece to be machined into the lathe.

The arrangement described above therefore permits automatic feeding and unloading of the lathe. The displacement of the rod 4 of the pusher in the direction for unloading of the lathe for the operations of loading and unloading may be controlled so as to take place automatically, since the end of the rod 4 acts on the push button 49 of the distributor 51 operating the lift, which in turn frees the rotary member 38, the latter at the end of the rotational step effecting return movement of the rod 4.

The invention is obviously not limited to the embodiment above described and illustrated in the drawings. This embodiment could undergo modifications of detail without departing from the scope of the invention.

I claim:

1. In a lathe, the provision of conveyor means for feeding and discharging workpieces comprising, a feed ramp, a discharge ramp, a rotatable cradle member positioned to receive workpieces from said feed ramp and to deposit machined workpieces on said discharge ramp, a turret mounted for rotational movement about an axis parallel to that of the lathe spindle and having a passage therein offset from and parallel to said rotational axis, means to rotate said turret between positions in which the passage therein is aligned respectively with a workpiece on the cradle member and the lathe spindle axis, a pusher reciprocable within the turret, said pusher being engageable in one position with the workpiece on the cradle member thereby to move said workpiece through the turret passage, and being engageable in another position with the machined workpiece in the lathe thereby to move said machined workpiece through the turret passage to deposit it on the cradle member, means to rotate the turret and to operate the pusher in mutually timed relationship, and means to effect intermittent rotation of the cradle member in timed relation to the rotation of the turret and the operation of the pusher.

2. In a lathe, the provision of conveyor means for feeding and discharging workpieces comprising, a feed ramp, a discharge ramp, a rotatable cradle member positioned to receive workpieces from said feed ramp and to deposit machined workpieces on said discharge ramp, a turret mounted for rotational movement about an axis parallel to that of the lathe spindle and having a passage therein offset from and parallel to said rotational axis, a tailstock on said turret, means to rotate the turret between a first position in which the passage therein is aligned with a workpiece on the cradle member and a second position in which said passage is aligned with the lathe spindle axis, and thereafter to further rotate the turret between said second position and a third position in which the tailstock is aligned with the lathe spindle axis, a pusher reciprocable within the turret, said pusher in one position being engageable with the workpiece on the cradle member to move said workpiece through the turret passage to a position on the lathe spindle axis, and being engageable in another position with the machined workpiece in the lathe thereby to move said machined workpiece through the turret passage and deposit it on the cradle member, means to rotate the turret and to operate the pusher in mutually timed relationship, and means to effect intermittent rotation of the cradle member in timed relation to the rotation of the turret and the operation of the pusher.

3. In a lathe, the provision of conveyor means for feeding and discharging workpieces comprising, a feed ramp, a discharge ramp, a rotatable cradle member positioned to receive workpieces from said feed ramp and to deposit machined workpieces on said discharge ramp, a turret mounted for rotational movement about an axis parallel to that of the lathe spindle and having a passage therein offset from and parallel to said rotational axis, a centering tool and a tailstock on said turret also offset from the rotational turret axis, means to rotate the turret between a first position in which the passage therein is aligned with a workpiece on the cradle member to a second position in which said passage is aligned with the lathe spindle axis, then to rotate the turret between said second position and a third position in which the centering tool is aligned with the lathe spindle axis, and thereafter to rotate the turret to a fourth position in which the tailstock is aligned wih the lathe spindle axis, a pusher reciprocable within the turret parallel to the passage therein, said pusher in one position being engageable with a workpiece on the cradle member to move said workpiece through the turret passage to a position on the lathe spindle axis and in another position being engageable with the machined workpiece in the lathe thereby to move said machined workpiece through the turret passage and deposit it on the cradle member, means to rotate the turret and to operate the pusher in mutually timed relationship, and means to effect intermittent rotation of the cradle member in timed relation to the rotation of the turret and the operation of the pusher.

References Cited in the file of this patent

UNITED STATES PATENTS

| | | |
|---|---|---|
| 701,081 | Pierce | May 27, 1902 |
| 1,541,118 | Cole | June 9, 1925 |
| 1,945,662 | Smith | Feb. 6, 1934 |
| 2,097,646 | Rupple | Nov. 2, 1937 |
| 2,392,186 | Pierle | Jan. 1, 1946 |
| 2,404,161 | Bower | July 16, 1946 |
| 2,539,723 | Branch | Jan. 30, 1951 |
| 2,570,660 | Gamble | Oct. 9, 1951 |

FOREIGN PATENTS

| | | |
|---|---|---|
| 489,791 | Great Britain | Aug. 4, 1938 |